[11] 3,544,769

| [72] | Inventor | Robert A. Hedin |
| | | Los Angeles County, California |
| [21] | Appl. No. | 628,599 |
| [22] | Filed | April 5, 1967 |
| [45] | Patented | Dec. 1, 1970 |
| [73] | Assignee | Digital Identification Systems, Inc. |
| | | Sun Valley, California |
| | | a corporation of California |

[54] ELECTRONIC IDENTIFICATION AND CREDIT CARD SYSTEM
7 Claims, 6 Drawing Figs.

[52] U.S. Cl. .................................................. 235/61.9,
194/4; 235/61.11, 235/61.12; 340/149
[51] Int. Cl. ...................................................... G07f 7/02,
H04q 5/16, G06k 7/06, G06k 17/00
[50] Field of Search ............................................ 235/61.9,
61.112, 61.12(C), 61.7, 61.8(A), 61.7(B); 194/4;
340/149(A)

[56] References Cited
UNITED STATES PATENTS

| 1,573,174 | 2/1926 | Lasker | 235/61.12(C)X |
| 2,890,432 | 6/1959 | Rockafellow | 235/61.12(C)X |
| 3,039,582 | 6/1962 | Simjian | 235/61.7(B)UX |
| 3,124,674 | 3/1964 | Edwards | 235/61.1 |
| 3,217,293 | 11/1965 | Metz | 235/61.7X |
| 3,237,164 | 2/1966 | Evans | 235/61.9X |
| 3,287,543 | 11/1966 | Halpern | 235/61.8(A)X |
| 3,355,576 | 11/1967 | Childers | 235/61.7(B) |
| 3,394,246 | 7/1968 | Goldman | 235/61.7 |
| 3,407,388 | 10/1968 | Goldman | 235/61.7X |

OTHER REFERENCES
IBM Technical Disclosure Bulletin -"Credit Card Design" by J. Svigals-Vol 9, No 3 August 1966(235/61.7(b)). on page 314

Primary Examiner—Daryl W. Cook
Assistant Examiner—Robert M. Kilgore
Attorney—Teagno & Toddy ABSTRACT: An identification key containing uniquely coded electrical circuits is entered into a time-sharing computer system to verify credit rating, debit or credit of a corresponding account, and provide appropriate records of transactions. The terminal device for accepting the key replaces many of the functions of a conventional cash register. A central data processor communicates with a number of remote terminal devices on a time-sharing basis, via interconnecting telephone lines or other data links. Coding of the key is by means of permuted circuit closures providing approximately four trillion unique codes with a forty-four pin key receptacle sufficient to identify the entire world's population.

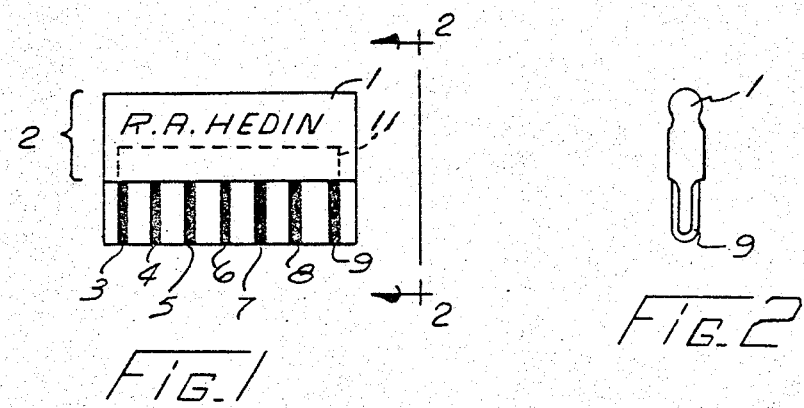
Fig.1
Fig.2
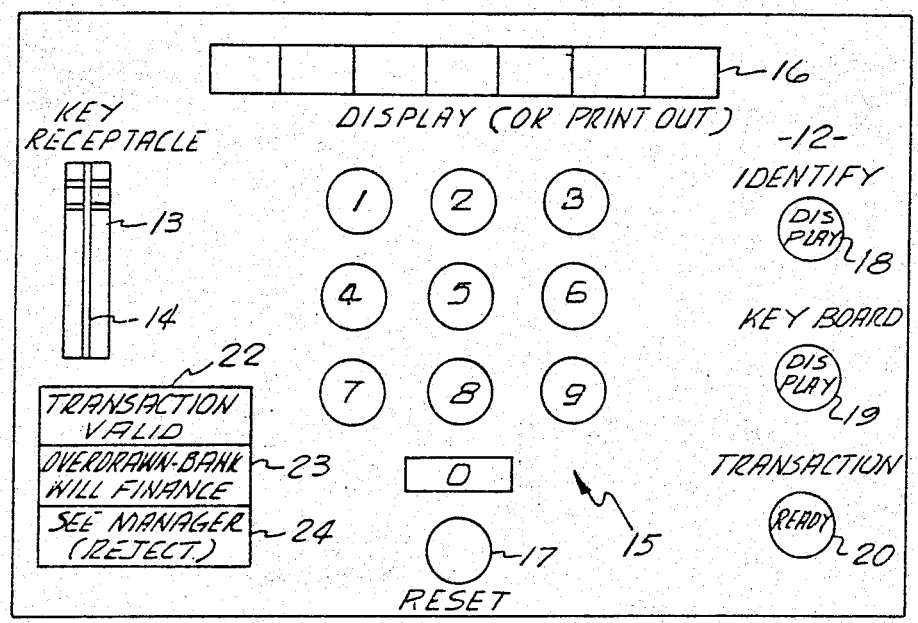
Fig.3
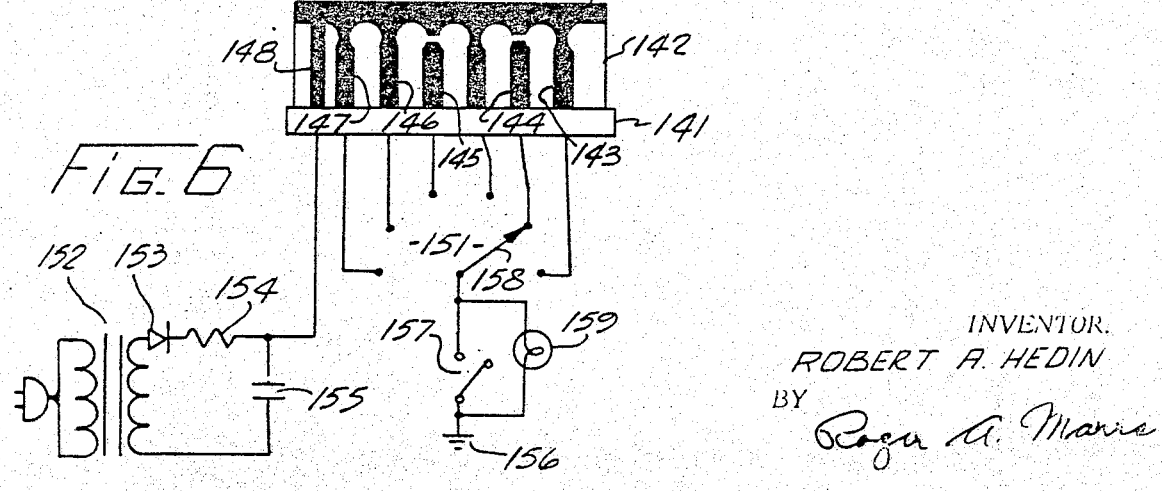
Fig.6
INVENTOR.
ROBERT A. HEDIN
BY
Roger A. Marie

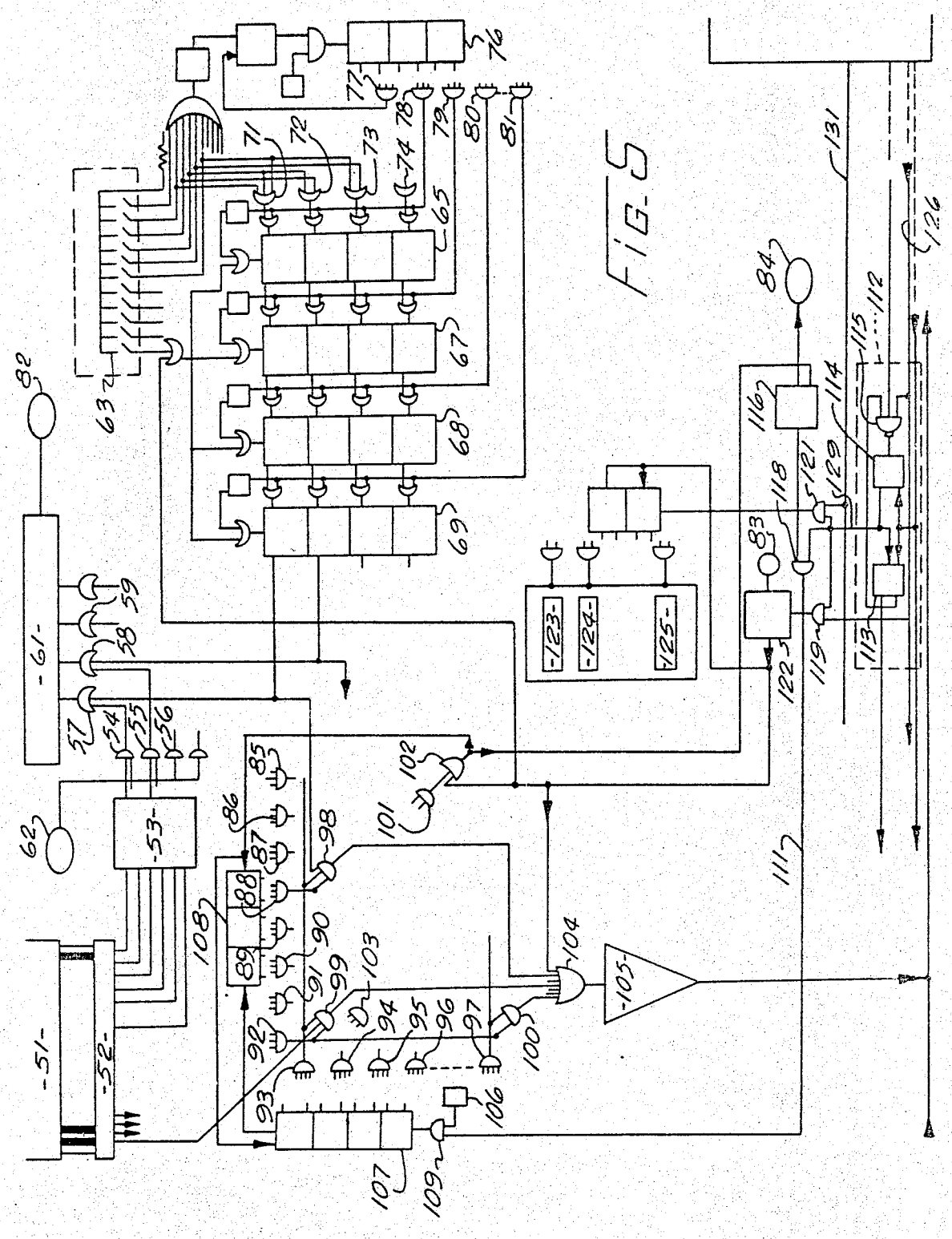

INVENTOR.
ROBERT A. HEDIN
BY Roger A. Marrs

ELECTRONIC IDENTIFICATION AND CREDIT CARD SYSTEM

BACKGROUND OF THE INVENTION

1. Field of the invention

This invention relates to a data processing system for electronically identifying each of an extremely large number of individuals upon insertion of coded "keys" into a terminal device remotely located from a time-sharing central data processor. The "key" operates by closing a unique combination of circuit paths upon its insertion into a receiving receptacle in the terminal device. Additional data, relating to the particular transaction, may be entered into the central data processor by means of a companion keyboard or other data input device, such as a price ticket reader. The entered data are read by the central data computer or processor and the identified account is adjusted to conform with the nature of the transaction if the automatic verification step is successfully completed.

2. Description of the Prior Art

There have been proposed, heretofore, various schemes for constructing automatic credit identification, verifying and auditing systems. Typical ones of such systems are shown in U.S. Pat Nos. 1,927,556; 2,902,541; and 3,221,304. While such systems have provided a number of desirable features, including a relatively large number of available combinations and internal security, they have failed to achieve any substantial commercial success due to their excessive complexity, high cost and inability to accommodate the extremely large number of input codes and data combinations required in a practical system. Also they have, for the most part, lacked the essential flexibility with respect to encoding or reencoding the keying device, required in a practical implementation of such a system. The present invention overcomes these shortcomings of prior systems and additionally provides many advantages over prior methods and apparatus heretofore intended to accomplish generally similar purposes.

SUMMARY OF THE INVENTION

The key element comprises a small insulated strip or card having disposed thereon a plurality of separate circuit paths arranged to correspond to a binary code uniquely identifying the "key" from all of the other keys made for use with the system. The circuit paths of the key, upon being inserted into the receptacle of the terminal device, connect to a decoding matrix and its associated logic circuits. The matrix and logic circuits are periodically interrogated by a central computer coupled to the terminal device via a communications link. Related data, whether automatically or manually entered, are also transmitted to the computer for transaction processing. This arrangement permits automatic deposit or withdrawal of funds, transmission of credit information, loan transactions, and purchasing. Alarms and other control functions can optionally be obtained from the system, as will appear hereinafter. Other modifications are also possible. For example, if a key is physically lost or stolen, the system may be so advised and as a consequence, a subsequent attempt to utilize the "lost" or stolen key would trigger an alarm and prevent unauthorized use of the key. No transaction would take place with this lost or stolen key. If added security is required, upon recognition of a bad key, the sensing current through the key could be stepped up to the point that it destroys the key.

Having in mind the shortcomings of prior automatic credit auditing systems, it is an object of this invention to provide an automatic key identification and credit card system which overcomes the difficulties and disadvantages of such prior systems.

Another object of this invention is to provide an automatic credit identification and data handling system which is simpler in structure, more reliable in operation, and more compact in size than similar apparatus heretofore known in the art.

Still another object of this invention is to provide a novel and improved key card and reading apparatus therefor utilizing a binary code for permuting the encoding therein.

Yet another object of the invention is to provide a novel and improved binary coded key-card system having an alarm which is responsive to preset credit limits, unauthorized use, or other specified conditions of use.

It is still another object of this invention to provide a novel and improved key-card and data processing system which is sufficiently flexible to permit a variety of modes of operation, including updating, revision, parity checking, fail-safe, etc.

BRIEF DESCRIPTION OF THE DRAWINGS

The features of the present invention which are believed to be novel are set forth with particularity in the appended claims. The present invention, but as to its organization and manner of operation, together with further objects and advantages thereof, may best be understood by reference to the following description, taken in connection with the accompanying drawings, in which:

FIG. 1 is a front elevational view of a key card employed in accordance with the invention;

FIG. 2 is an end elevational view of the key card shown in FIG. 1;

FIG. 3 is a front elevational view of a remote terminal device designed to accept the key-card of FIG. 1;

FIG. 5, diagrammatically illustrated, in logic form, shows an overall key-card identification and credit accounting system, constructed in accordance with the invention; and FIG. 6 is a schematic circuit diagram of a key-card encoding device.

DESCRIPTION OF THE PREFERRED EMBODIMENT

Figure 4:
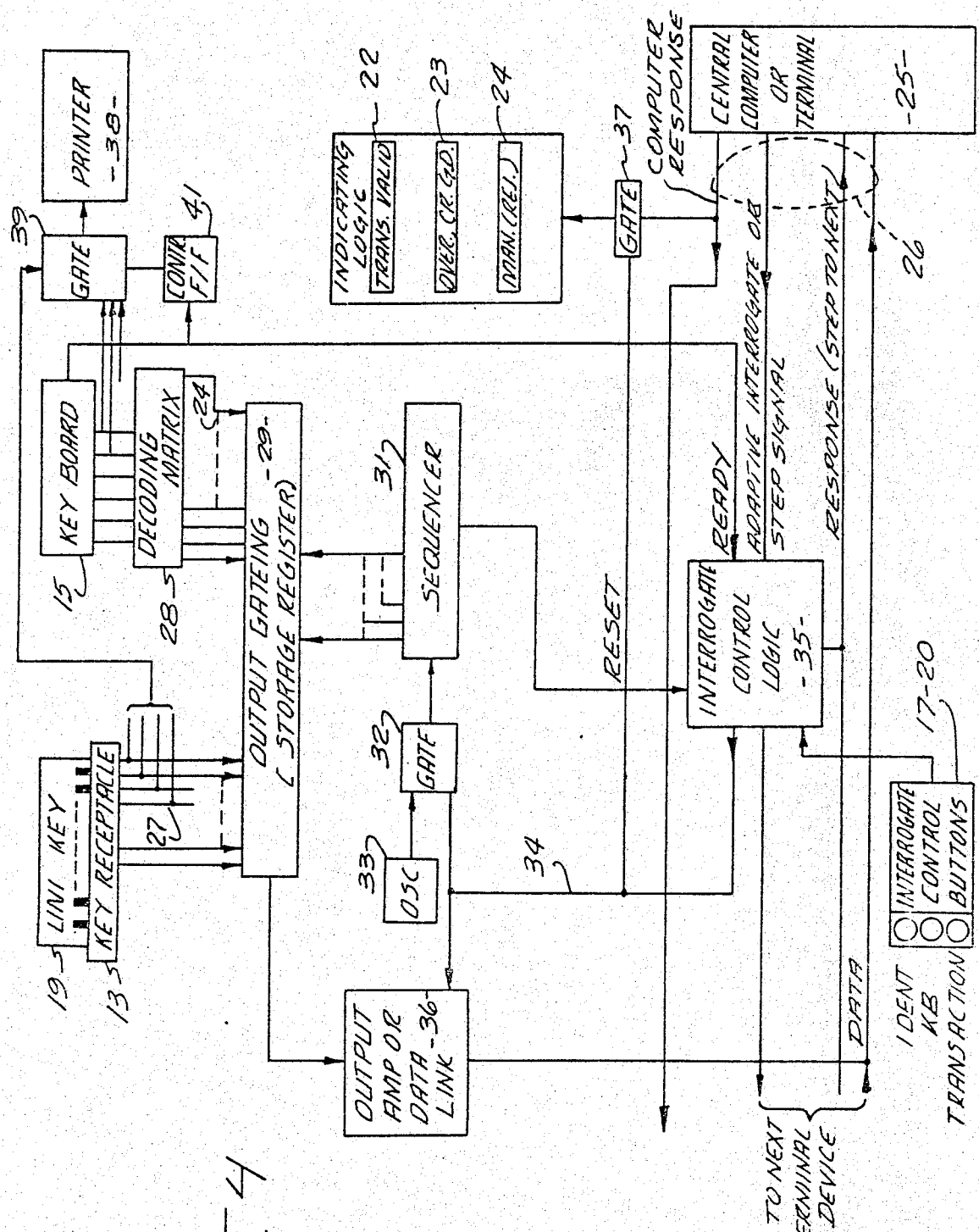
FIG. 4 is a block diagram of the control and information signal handling employed in the remote terminal device as used at the site of a credit transaction.

Referring to FIG. 1, there is shown a key-card which is designed to mate with a receiving receptacle in the terminal device of FIG. 2. Typically, the key-card may comprise a 3 inch long × ¾ inch wide × 1/16 inch thick plastic strip 1 having an integrally formed handle portion 2 which facilitates insertion and removal of the key-card from its receptacle. The conductors 3—9 which comprise the coding means are wrapped around three sides of strip 1, and are disposed in a plurality of vertically spaced rows. To facilitate teaching of the invention, only seven rows of conductors are shown. However, it is contemplated that fifty or more rows could readily be accommodated. Each of the conductors is connected to a vertically extending common conductor 11, disposed along one end of each row. The opposite end of each row is left open and is adapted to engage mating conductors in the receptacle of the terminal device. Additional details of the key-card itself will be found in my copending application Ser. No. 503,888, filed Oct. 23, 1965, now U.S. Pat No. 3,336,635, and entitled BINARY CODED ELECTRONIC LOCK AND KEY.

The terminal device shown generally at 12 in FIG. 3 performs certain functions of a cash register and additionally reads the data encoded in the key-card of FIG. 1. Key receptacle 13 comprises an insulated opening 14 of complimentary size and shape with respect to the key-card. There is provided within the receptacle a plurality of spaced conductors adapted to engage corresponding ones of the conductors 3—9 when the key is inserted in the receptacle 13. Coding of the key-card is effected by placing circuit discontinuities in certain ones of conductors 3—9. For example, a completed circuit via a given conductor corresponds to a binary "one" whereas an open circuit at a given conductor corresponds to a binary "zero." The key-card shown in FIG. 1 will permit $2^7$ combinations or separate identifying codes. Other details of this basic scheme are disclosed in the above mentioned copending application.

In addition to the key-card receptacle 13, the terminal device is provided with a ten-key manual keyboard, indicated generally at 15. A numerical display 16 permits the operator to read data generated within the system. Control functions are provided by the buttons marked "reset," "identity," "keyboard," and "transaction" identified as 17—20, respectively. Signal lamps 22—24 indicate the functions of "transaction valid," "overdrawn-bank will finance" and "reject," respectively.

The terminal device 12 is connected to a wire link, or other suitable data transmission channel, to a central data processor. This overall arrangement is illustrated in schematic form in FIG. 4. The central computer or data processor 25 is connected in parallel to a plurality of terminal devices via cable 26. For the sake of simplicity, only a single terminal device is illustrated; however, it should be understood that any number of such devices may be coupled to cable 26.

The key-card 19, encoded with a given individual's social security number, account number, weight, height, hair color, eye color, complexion, sex, age, etc., is inserted into receptacle 13 to commence a transaction. Also, transaction information is manually entered into keyboard 15. The key-card data are decoded via matrix 27 and the keyboard data are encoded via matrix 28. The parallel binary digital code derived from matrices 27 and 28 is supplied to storage register 29. This register 29 may be interrogated via sequencer 31 which in turn is responsive to gate 32 and clock oscillator 33. Upon depressing buttons 17—20, and receiving an interrogate signal from the data processor, a gate control signal will appear on line 34 via the interrogate control logic 35. This gate control signal 34 will open AND gate 32 and permit clock pulses from oscillator 33 to enter sequencer 31. The clock pulses supplied to sequencer 31 will cause storage register 29 to be read out in a serial mode to output amplifier and data link 36. Also, this sequence of events will permit corresponding ones of signal lamps 22—24 to indicate the type of function being performed. This indicating function is accomplished via gate 37.

If desired, the terminal device 12 may be provided with a printer 38 which is responsive to the outputs of matrices 27—28 via gate 39, and to control flip-flop 41, to record in numerical form the data entered both via the key-card 19 and the keyboard 15.

If the information entered and displayed, or printed out, is considered correct by the operator, the transaction ready button 20 is depressed and the data are ready to be automatically transferred via cable 26 to processor 25. When the processor sequences to this particular terminal device, in its time-sharing sequence, the account number and the transaction date (which are available in binary-coded form) are read out. The account number is recognized by the processor 25 and the corresponding account file is addressed. The patron's account file is appropriately debited or credited in accordance with the accompanying transaction data read out from the terminal device 12. If the patron's account is overdrawn, but his credit is good, then the processor 25 will make appropriate financing notations in the file within preset limits. If there is an attempt made to overdraw the account beyond the preset limit, the reject signal lamp 24, at the terminal device 12, will be turned on. Alternatively, an indication of a valid transaction at lamps 22 or 23 will ensue and the processor 25 will sequence to the next terminal device in the system. If this next terminal device is not in a "ready" mode, then the process automatically sequences to the next-in-line terminal device.

The circuit elements to accomplish the above described functions will be described in further detail in connection with FIG. 5. Details of the central data processor 25 are not included herein since this portion of the system is beyond the scope of the present invention and also for the reason that this portion of the system may comprise any suitable electronic data processing machine (EDPM) of the type well-known and widely used in the automatic processing of business data. As is well known to those versed in the art, these types of EDPM apparatus comprise input-output units, an arithmetic unit, a memory unit, and a control unit. An EDPM suitable for use in the system of the present invention is shown in U.S. Pat. No. 2,959,351, entitled DATA STORAGE AND PROCESSING MACHINE. It will be understood that various kinds of peripheral equipment, such as disk files, magnetic tape recorders for historical files, etc. may be added to the overall system in a well-known manner. Additionally, the key-cards may be used to initiate certain kinds of supervisory and control functions, as will become apparent upon consideration of the following description of FIG. 5.

Upon insertion of the key-card 51 into receptacle 52, binary-to-decimal diode matrix 53 converts the patron's binary coded identify data into a decimal printout and/or readout via gates 54—59, to display 61. Actual readout is initiated by button 62. The operator then visually checks the patron's identity (height, eye color, etc.) with the data readout on the display 61. If the identity is verified, then the operator manually enters the transaction data (purchase price, refund, etc.) into the ten-key manual keyboard 63. Each decimal digit manually entered into the keyboard 63 will be transferred to a corresponding four-bit least significant (LSB) bit register 65, via corresponding ones of gates 71—75. When the next decimal digit is entered into the keyboard 63, the first (original) number in the LSB register 65 is first transferred to the next most significant register 67, and erased from the LSB register 65. This second (newly entered) number is then entered into the cleared LSB register 65. This transfer sequence is repeated to higher-order bit registers 68—69 until the transaction data are completely entered. The transferring and clearing functions are accomplished via counter 76 and gates 77—81 which sequentially scan each binary-coded decimal (BCD) register 65—69 each time a new key on the keyboard 63 is depressed. After completion of the manual keyboard entry, the print and/or the display button 62 or 82 is depressed to permit verification of the operator's entry. If an error is detected by the operator, the reset button 83 is depressed, thereby clearing the registers to permit the correct entry to be made. If there are no errors, the ready button 84 is depressed and the terminal device is made ready to transmit the data stored therein to the central data processor when sequentially interrogated. The output logic comprises gates 85—103, AND gate 104, and output amplifier 105. Clock pulses are generated by oscillator 106 and supplied to the various registers 65—69, and 107—108 via AND gate 109.

A plurality of terminal devices may optionally be connected to the central data processor. However, a recognition code identifying each device, must be transmitted along with the transaction data. Alternatively, a recognition circuit may be wired directly to the processor. The various terminal devices are serially scanned and if a particular terminal device is not in a condition to transmit data, it is skipped over and the next terminal device in sequence is then scanned. If after a given interval (typically 0.5 milliseconds) no response or readout has been obtained, the central data processor will automatically step to the next terminal device. If the ready signal is present on line 111, the processor will stop scanning for approximately 10 milliseconds while the transaction data are transmitted. In either case, when a new terminal device is stepped to, the preceding device responds with an all-clear signal. In the absence of an all-clear signal, an error will be indicated on that terminal device which is bypassed until it can be restored to service. The preceding terminal device, which will now have been turned off, will not be interrogated again until all of the remaining terminal devices on the line have been scanned in sequence. Typically, a system can handle economically 100 transactions per second and may interrogate 1,500 terminal devices before receiving the data comprising all 100 transactions.

The recognition circuit 112 comprises flip-flops 113—114, AND gate 115 and the appropriate input and output lines. A "transaction ready" signal originating with button 84 is sent to flip-flop 116, together with a control signal from gate 102. The output from flip-flop 116 is supplied on line 117 to gate 118, which in turn provides the clock synchronizing signal to gate 109. The recognition circuit 112 also provides control pulses to gates 119 and 121, which in turn operate one-shot multivibrator 122 for controlling indicator lamps 123—125.

The sequential switching is accomplished by means of a logic circuit comprising certain ones of the above-described gates and flip-flops. This is three-input AND gate and two JK flip-flops connected as a two-stage counter. The circuit is initially reset to a starting condition when all of the terminal devices have been scanned. Terminal device number one is then ready to be interrogated. When the advance pulse is received on line 126 from the data processor, the AND gate 115 in terminal device number one is satisfied and the first stage 114 of its two-stage counter is set. The true output appearing on line 129 initiates the output gating and sequencing of the account number from the key-card, and also the transaction data from the keyboard registers 65—69 into the output amplifier and data link 105.

After the data processor response has been received on line 131 and displayed by display 61, an advance pulse on line 126 resets the first stage 114 and triggers the second stage of flip-flop 113 to its set state. This action inhibits the AND gate 115 of register 65 and opens the AND gate of register 66. This process is sequentially repeated until all of the registers 65—69 have been scanned and the system is preset to its starting condition in preparation for a new interrogation cycle.

There is shown in FIG. 6 a schematic diagram of the key-card encoding apparatus. A receptacle 141 receives the uncoded key-card 142, having all of its circuit-path conductors 143—149 intact. The terminal end of each conductor 143—149 connects to a corresponding contact on rotary switch 151. A power supply comprising transformer 152, rectifier 153, current-limiting resistor 154, and capacitor 155 supplies a direct current to first conductor 143. The return path to the power supply ground 156 is via switch 157, rotary contact 158 of switch 151. When key-card 142 is placed in receptacle 141, the first binary zero in the code is selected by suitably setting switch 151. Thereafter, switch 157 is closed and capacitor 155 discharges through the fused section of the selected conductor 143—149 on the key-card 142. This permanently opens this circuit path on the key-card. Successive binary zeros are similarly encoded. This means provides a simple and economical way to encode the key-cards. The code may be ascertained by rotating switch 151 through its various steps while observing indicator lamp 159.

As can be seen, there is provided by the above-described system, a novel and improved device for peripheral connection to an EDPM system which will facilitate transmission of identification and transactions thereto and therefrom.

While the invention has been illustrated and described in terms of a particular embodiment, it is not intended to be limited to the details shown, since various modifications, omissions, and structural changes may be made without departing in any way from the actual scope of the invention. It is, therefore, intended that the invention be limited only by the following claims.

I claim:

1. In an electronic identification and transaction accounting system, a time-sharing remote terminal for interconnection, via a communications link, with a central data processor, comprising:
key means permanently encoded with a parallel binary permutation code for generating an account identity input signal to said terminal in the form of a parallel binary code;
keyboard means for manually generating decimally-coded transaction data at said remote terminal;
code conversion means connected to said keyboard means for translating said decimally-coded transaction data to a corresponding parallel binary code;
data register means having a parallel binary code input connected to said key means and said code conversion means for receiving and storing said parallel binary coded account identity input and said parallel binary coded transaction data;
interrogate control logic, connected to said communications link and to said data register means, and responsive to an interrogation control signal received from said central data processor for causing the account identity and the transaction data to be serially read out from said data register means into said communications link for serial transmission to said central data processor;
indicating logic means in said remote terminal responsive to an indicating signal received from said central data processor, via said communications link, upon completion of the transmission of one complete set of said account identity and transaction data codes, to indicate the result of the transmission of said set of account identity and transaction data to said central data processor, and to provide a reset signal to said remote terminal; and
a sequencer in said remote terminal responsive to the reset signal received from said central data processor, via said indicating logic means, to clear said data register means and reset said indicating logic means so as to be responsive to the next-arriving indicating signal from said central data processor.

2. An electronic identification and transaction accounting system as defined in claim 1 including; indicator display means connected to said data registration means for displaying said account identity code and said transaction data.

3. An electronic identification and transaction accounting system as defined in claim 2 including; recognition circuit means in said remote terminal to inhibit receipt of said interrogation signal until said data register means have been provided with both said account identity input and said transaction data.

4. An electronic identification and transaction system, comprising:
a binary-coded key device containing identification data in the form of parallel open and closed circuits which may be sensed electrically as a parallel binary code;
a terminal device for selectively receiving said key device and cyclically acting to electrically sense said identification data and thereby generate a corresponding parallel binary coded identification signal, with the ability to give an alarm and/or destroy the key in case of illegal or stolen keys;
first display means associated with said terminal device and responsive to said identification signal to visibly display said identification data in parallel form;
manually operated keyboard means associated with said terminal device for selectively generating a parallel decimally-coded electrical transaction signal;
data register means in said terminal device for converting parallel-coded data from said key device and from said keyboard means to a serial format;
data processor means remotely located with respect to said terminal device for cyclically receiving said identification and transaction signals in a serial mode from said data register means, and for performing arithmetic operations on said signals to generate control pulses which are transmitted to said terminal device;
a data link coupled between said terminal device and said data processor means for the serial transmission of said signals and said control pulses therebetween; and
second display means associated with said terminal device and responsive to said control pulses received via said data link to generate a visible indication of the functioning of said data processor means.

5. An electronic identification and transaction system as defined in claim 4 including; recording means associated with said terminal device and responsive to the output of said data register means for visibly recording said identification and said transaction data.

6. An electronic identification and transaction system as defined in claim 4 wherein said key device comprises:
an insulated strip having a handle portion and a circuit support portion; and
a plurality of selectively fusible circuit path conductors disposed in parallel spaced-apart relationship on said support portion, each of said conductors having a common terminus and a separate terminus.

7. An electronic identification and transaction system as defined in claim 4 including:
a plurality of said terminal devices; and
a plurality of sequencer means equal in number with said terminal devices interposed between corresponding ones of said terminal devices and said data link for sequentially coupling corresponding ones of said terminal devices with said data processor.

UNITED STATES PATENT OFFICE
CERTIFICATE OF CORRECTION

Patent No. 3,544,769    Dated December 1, 1970

Inventor(s) Robert A. Hedin

It is certified that error appears in the above-identified patent and that said Letters Patent are hereby corrected as shown below:

Column 2, line 52, "3,336,635" should read -- 3,392,558

Signed and sealed this 25th day of July 1972.

(SEAL)
Attest:

EDWARD M. FLETCHER, JR.
Attesting Officer

ROBERT GOTTSCHALK
Commissioner of Paten